(12) United States Patent
Hanson et al.

(10) Patent No.: US 8,152,509 B2
(45) Date of Patent: Apr. 10, 2012

(54) GAP ADJUSTING MECHANISM FOR ROLLS ON A ROLL STAND USED IN THE EXTRUSION FORMING OF A SHEET PRODUCT

(75) Inventors: Dana R. Hanson, St. Charles, IL (US); Mitchell L. Gritzner, Montgomery, IL (US); Ryan E. Leopold, Sycamore, IL (US)

(73) Assignee: Processing Technologies, LLC, Aurora, IL (US)

( * ) Notice: Subject to any disclaimer, the term of this patent is extended or adjusted under 35 U.S.C. 154(b) by 270 days.

(21) Appl. No.: 12/455,376

(22) Filed: Jun. 1, 2009

(65) Prior Publication Data

US 2010/0301507 A1 Dec. 2, 2010

(51) Int. Cl.
*B29C 43/46* (2006.01)
(52) U.S. Cl. ......... 425/172; 425/189; 425/194; 425/367
(58) Field of Classification Search .................. 425/172, 425/173, 189, 194, 327, 367; 72/244, 248; 100/168; 164/428
See application file for complete search history.

(56) References Cited

U.S. PATENT DOCUMENTS

| | | | | |
|---|---|---|---|---|
| 2,025,562 | A * | 12/1935 | Balsiger | 425/367 |
| 2,528,075 | A * | 10/1950 | Peterson | 72/248 |
| 2,968,832 | A * | 1/1961 | Hale et al. | 425/367 |
| 3,307,500 | A * | 3/1967 | Seewer et al. | 425/367 |
| 3,452,568 | A * | 7/1969 | Vihl | 72/248 |
| 3,936,258 | A * | 2/1976 | Lake | 425/367 |
| 4,649,986 | A * | 3/1987 | Frischknecht et al. | 72/248 |
| 4,991,420 | A * | 2/1991 | Frischknecht et al. | 72/248 |
| 5,112,208 | A * | 5/1992 | Voth | 425/367 |
| 5,180,593 | A * | 1/1993 | Mistretta et al. | 425/363 |
| 5,674,543 | A * | 10/1997 | Partida | 425/367 |

* cited by examiner

*Primary Examiner* — James Mackey
(74) *Attorney, Agent, or Firm* — Wood, Phillips, Katz, Clark & Mortimer (57) ABSTRACT

A roll stand for use in the extrusion forming of a sheet product from a flowable material having a main frame supporting first and second rolls between which there is a first gap through which at least one sheet layer passes during sheet product formation. A first adjusting mechanism moves the first roll relative to the second roll so as to vary a dimension of the first gap. The first adjusting mechanism has a first element that is moved by a first actuator that is: a) maintained on the apparatus; b) engageable by a hand of an operator; and c) manually movable through an operator's hand to thereby cause repositioning of the first roll.

17 Claims, 8 Drawing Sheets

GAP ADJUSTING MECHANISM FOR ROLLS ON A ROLL STAND USED IN THE EXTRUSION FORMING OF A SHEET PRODUCT

BACKGROUND OF THE INVENTION

1. Field of the Invention

This invention relates to extruded sheets and, more particularly, to an apparatus for continuously forming a sheet product using a roll stand with cooperating rolls between which material passes during the sheet product formation process.

2. Background Art

Extruded sheets are formed from many different materials, with many different thicknesses, and with different layer constructions. An extruded sheet may be formed by itself or combined with one or more other sheet layers that are concurrently formed, or combined after formation.

In a typical apparatus for extrusion forming sheet products, a roll stand is placed downstream of an extruder assembly with an associated sheet die. Flowable material is delivered through the sheet die to a nip/lamination location between adjacent rolls on the roll stand. The applied material is advanced through a gap between the adjacent rolls defined at the nip/lamination location from where it may be routed between one or more additional roll pairs before it arrives at a downstream accumulation location at which the sheet product may be rolled, stacked, packaged, staged, or otherwise handled or processed.

In one exemplary roll stand, there is a roll that cooperates with two adjacent rolls, with the rolls cooperating to facilitate layer, and ultimately sheet product, formation. The gaps between adjacent rolls must be variable to allow an apparatus to have the flexibility to make layers of different thicknesses and products with potentially different combinations of sheet layers that may have thicknesses varying over a significant range.

Such apparatus may be integrated into a line wherein multiple products with different constitution and/or thickness may be serially produced. Accordingly, it is important that the system operator have the ability to readily and accurately adjust the roll gaps to those appropriate for a particular run.

Given that gap control may be required at a number of different locations, it is also important that the mechanisms for varying the gap be reliable in operation and economically feasible.

Heretofore, gap adjusting mechanisms have varied significantly in terms of their complexity, reliability, and accuracy. At one end of the spectrum, it is known to incorporate relatively simple adjusting mechanisms that are operated using a conventional wrench. The system operator is required to have on hand the requisite tooling/wrench that is moved from location to location on the apparatus to make the necessary adjustments. Since a substantial force may be required to turn the wrench to effect adjustments, operators will commonly use a separate, elongate extender bar that can be grasped and manipulated to provide more leverage.

Additionally, since the gap between adjacent rolls is commonly adjusted through separate mechanisms at the spaced ends of the roll, the operator is often required to make incremental adjustments, going back and forth between the ends until the desired gap is established.

Another drawback with this type of setup is that it is difficult for the operator to determine when the desired gap is actually arrived at. Such a determination may involve using a separate measuring instrument. In the event that the gap is not consistent and of the desired dimension, resulting sheet product may be compromised in terms of quality or could even be unusable, in which event a substantial amount of product may have to be scrapped.

Another known adjusting mechanism incorporates conventional block and tackle components to selectively raise and lower one or more rolls relative to another roll to control gap. While this type of system avoids the requirement that necessary separate tooling be kept on hand, the adjustments made using these types of components may be relatively crude. Again, the difficulty in precisely setting a desired gap and identifying the same without onerous measurements, exists with this design.

As an alternative, it is known to use motorized mechanical devices and/or servohydraulic mechanisms to reposition the rolls to set the gap. As mentioned, these mechanisms can get very complex and expensive and require a power supply.

In one form, a separate actuator is required to be kept on hand to be moved separately to each of the mechanisms that is required to be operated for adjustment of the gap. Since these mechanisms are capable of relatively quickly changing the gap dimensions, the operator may have to change operating directions, one or more times, to compensate for an overrun during the adjustment process.

Still further, these designs require that operators contend with the aforementioned problem of accurately identifying when a desired gap has been established.

With some of the power operated mechanisms, the operating drive will be a separately powered component that must be moved to a number of adjusting mechanisms to individually operate them. In the event that such drives are powered pneumatically or through an electrical lead from a supply, the operator will be required to reposition the drive without entangling the supply lines and the system components.

While the above devices have a number of drawbacks, the industry has continued to use them because there is lacking any substitute that addresses all of the issues relating to cost, convenience, reliability, and accuracy.

SUMMARY OF THE INVENTION

In one form, the invention is directed to a roll stand for use in the extrusion forming of a sheet product from a flowable material. The roll stand has a main frame and a plurality of rolls, including at least first and second rolls between which there is a first gap through which at least one sheet layer passes during sheet product formation. The first and second rolls each has spaced end supports through which the first and second rolls are maintained operatively positioned upon the main frame for movement respectively around first and second substantially parallel axes. The roll stand further includes a first adjusting mechanism through which the first roll can be moved relative to the second roll so as to vary a dimension of the first gap to accommodate sheet layers of different thickness. The first adjusting mechanism has a first element that is movable to cause repositioning of one of the end supports on the first roll and a first actuator for causing movement of the first element. The first actuator is maintained on the apparatus, engageable by a hand of an operator, and manually movable through an operator's hand in a first predetermined manner to cause incremental movement of the first element. This movement causes repositioning of the one of the end supports on the first roll, and thereby the first roll, relative to the second roll to change the dimension of the first gap.

In one form, the first actuator has first and second states. With the first actuator in the first state, movement of the first actuator in the first predetermined manner causes the one of the end supports on the first roll to move to increase the dimension of the first gap. With the first actuator in the second state, movement of the first actuator in the first predetermined manner causes the one of the end supports on the first roll to move to decrease the dimension of the first gap.

In one form, the first adjusting mechanism includes a first ratchet mechanism. The first actuator is movable in a predetermined manner in first and second opposite directions. With the first actuator in the first state the ratchet mechanism operates to cause the first actuator to move the first element to reposition the one end support to increase the dimension of the first gap as the first actuator is moved in the first direction, and allows the first actuator to be moved in the second direction without causing repositioning of the one end support. With the first actuator in the second state, the ratchet mechanism operates to allow the first actuator to be moved in the first direction without causing repositioning of the one end support, and causes the first actuator to move the first element to reposition the one end support so as to decrease the dimension of the first gap as the first actuator is moved in the second direction.

In one form, the first element is mounted for movement around a vertically extending axis and the first and second axes are substantially horizontal.

In one form, the roll stand has an upstream end, a downstream end and spaced sides. The first actuator has a first elongate handle that is graspable by a user's hand to operate the first actuator. The first elongate handle has a length that is alignable in a direction extending between the upstream and downstream ends of the roll stand to be stored so as not to project significantly away from the sides of the roll stand.

In one form, the first element is movable around an operating axis to cause repositioning of the one end support. The first actuator is keyed to the first element so that the first element follows movement of the first actuator around the operating axis.

In one form, the first actuator is captively blocked between parts of the first element and one of the end supports on the first roll that are spaced from each other along the operating axis.

In one form, there is a threaded support with a first set of threads on one of the end supports on the second roll and the first element has a second set of threads. As the first element is turned around the operating axis the first element shifts relative to the threaded support along the operating axis.

In one form, the one end support on the first roll has a bearing pad with a surface and the first element has a bearing surface that acts against the surface on the bearing pad as the one end support on the first roll is repositioned relative to the one end support on the second roll.

In one form, the one end support on the second roll is at all times fixed in relationship to the main frame.

In one form, the roll stand includes a second adjusting mechanism that cooperates between the other spaced end supports on the first and second rolls in substantially the same manner that the first adjusting mechanism cooperates between the one spaced end support on the first roll and the one spaced end support on the second roll.

In one form, the roll stand further includes a third roll with spaced end supports through which the third roll is maintained operatively positioned upon the main frame for movement around a third axis that is substantially parallel to the first and second axes. Another adjusting mechanism cooperates between the one spaced end support on the second roll and one of the spaced end supports on the third roll in substantially the same manner that the first adjusting mechanism cooperates between the one spaced end support on the first roll and the one spaced end support on the second roll, to thereby selectively vary a dimension of a second gap between the first and third rolls through which at least one sheet layer passes during sheet product formation.

In one form, the roll stand assembly is combined with an extruder assembly with a sheet die through which flowable material is delivered to a nip location between the first and second rolls.

In one form, the first element on the roll stand has a stepped outer diameter with first and second axially spaced portions. An annular surface between the axially spaced portions defines the part of the first element that blocks the first actuator. The first axially spaced portion of the first element is keyed to the first actuator.

In one form, the second axially spaced portion defines a bearing surface that acts against the one spaced end support on the second roll as the one end support on the first roll is repositioned relative to the one end support on the second roll.

In one form, the roll stand further includes a gap dimension measuring assembly with a gap dimension display. The gap dimension measuring assembly has a housing fixed to the main frame and a displacement measuring tip that engages the first roll, is repositioned relative to the housing as the first roll is moved, and thereby causes the gap dimension display to indicate degree of displacement of the first roll.

In another form, the invention is directed to a method of adjusting a gap between adjacent and cooperating first and second rolls on a roll stand to which a flowable material is supplied to continuously form a sheet product from at least one sheet layer that moves between the first and second rolls during formation of a sheet product. The method includes the step of providing a first adjusting mechanism having a first actuator that is inseparably maintained as part of the roll stand, includes a handle, and is movable in a predetermined manner. The method further includes the step of a hand grasping the handle and, through the hand grasped handle, moving the first actuator in the predetermined manner to vary the dimension of the gap.

In one form, the step of providing a first adjusting mechanism involves providing a first adjusting mechanism with a first actuator having first and second states. The method further involves the steps of placing the first actuator in the first state, wherein the step of moving the first actuator in the predetermined manner causes the dimension of the gap to increase, placing the first actuator in the second state, and moving the first actuator in the second state in the predetermined manner to thereby cause the dimension of the gap to decrease.

In one form, the roll stand has upstream and downstream ends. The handle has an elongate shape with a length. The method further involves placing the first actuator in a stored position, wherein the length of the handle aligns in a direction extending between the upstream and downstream ends of the roll stand, after a selected gap dimension is established.

In one form, a second adjusting mechanism is provided that is substantially the same as the first adjusting mechanism and operable in conjunction with the first adjusting mechanism to control the dimension of the gap.

DETAILED DESCRIPTION OF THE PREFERRED EMBODIMENT

Figure 1:
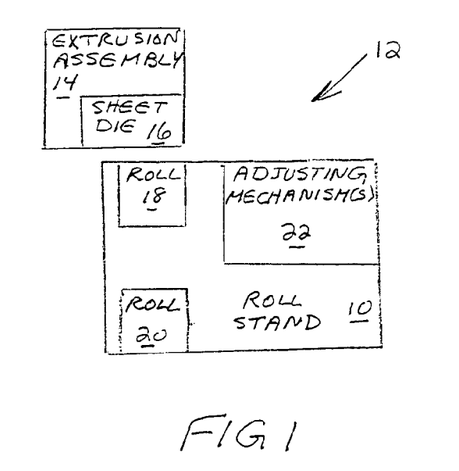
FIG. 1 is a schematic representation of an apparatus for extrusion forming a sheet product, including an extrusion assembly and a roll stand, according to the present invention.

As seen in FIG. 1, the invention is directed to a roll stand 10 for use in an extrusion forming apparatus 12. The extrusion forming apparatus 12 consists of at least the roll stand 10 and an extrusion assembly 14 with a sheet die 16 through which flowable material is delivered to the roll stand wherein it is processed into at least one sheet layer that makes up a sheet product, or is part of a composite sheet product. The roll stand 10 has a plurality of rolls, and at least first and second rolls 18, 20 in the plurality, that cooperate to process a sheet layer or layers. The rolls 18, 20 have a gap therebetween through which the sheet material passes during the formation process.

At least one adjusting mechanism 22, and in most cases a plurality of adjusting mechanisms 22, is provided to adjust a gap between the rolls 18, 20 and any other cooperating roll pair.

The apparatus 12 is shown schematically in FIG. 1 since it is intended to encompass extrusion forming apparatus 12 with components that vary significantly in terms of their construction and operation. The only thing that is critical to the present invention is the provision of at least two rolls 18, 20 that are movable towards and away from each other to control dimension of a gap therebetween to facilitate formation of a sheet layer that makes up, or is part of, a sheet product.

Figure 2:
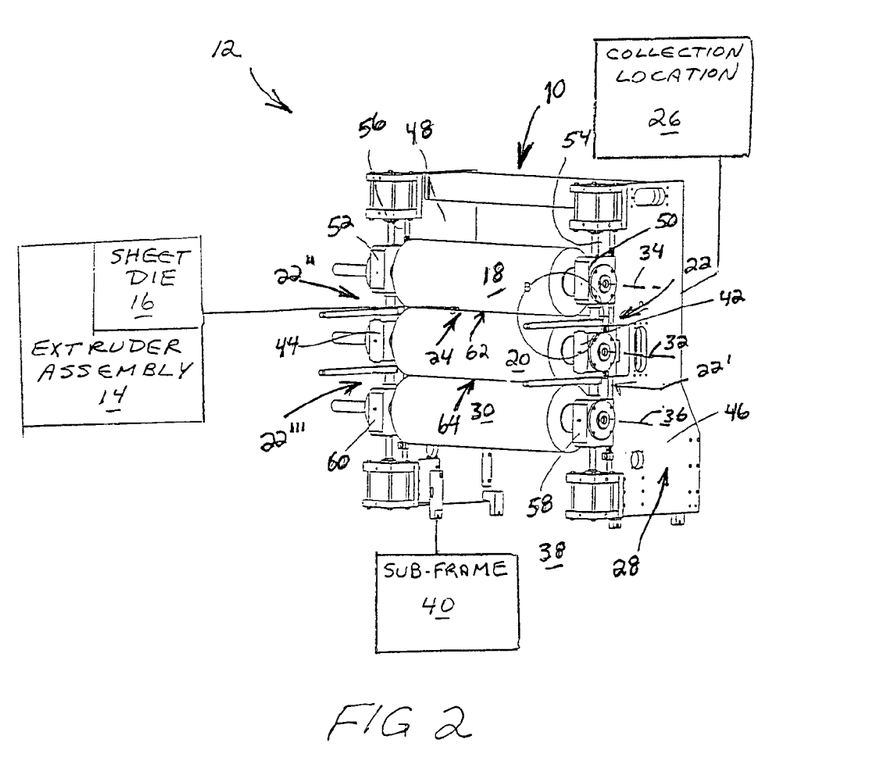
FIG. 2 is a partially schematic, perspective view of one specific form of roll stand, according to the invention, as shown in FIG. 1, and including multiple rolls between which operating gaps of variable dimension are formed.
Figure 3:
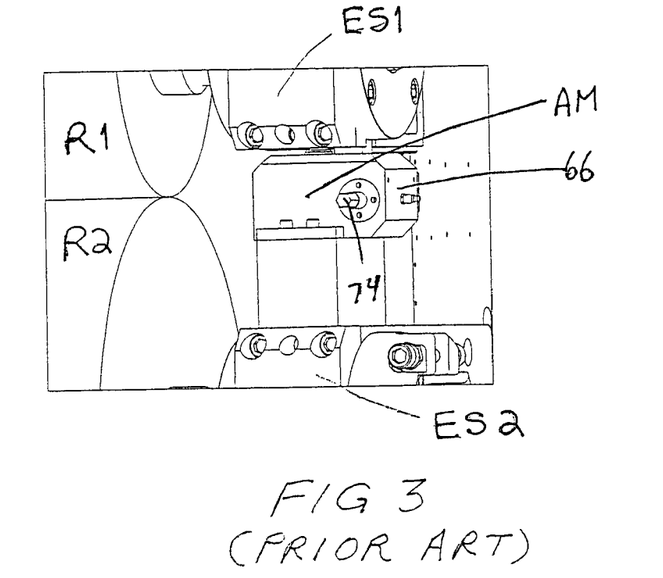
FIG. 3 is a fragmentary, perspective view of a conventional adjusting mechanism for changing a gap between cooperating rolls and with the gap between the rolls closed.
Figure 4:
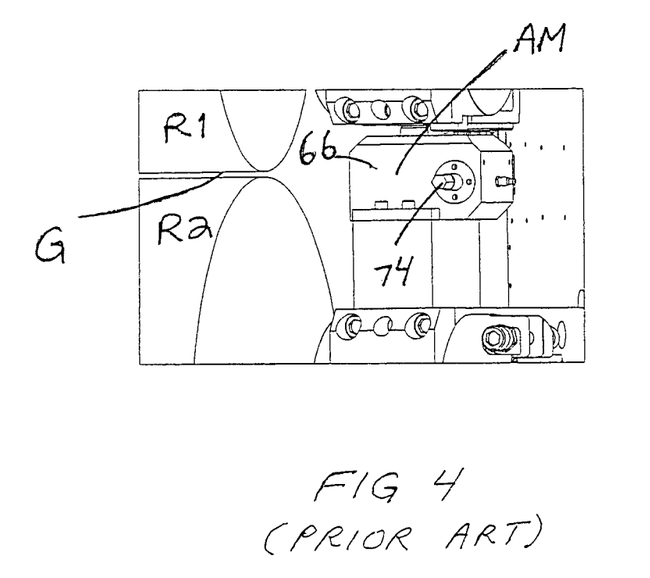
FIG. 4 is a view as in FIG. 3 with the gap open.

One more specific exemplary form of the apparatus 12 is shown in FIG. 2. In this embodiment, the extruder assembly 14 is upstream of the roll stand 10 and causes flowable material to be delivered from the sheet die 16 to a nip/lamination location 24 between the rolls 18, 20. The completed sheet product is directed from the roll stand 10 to a collection location 26 at which it is re-formed, stored, packaged, staged or otherwise handled.

The roll stand 10 consists of a main frame 28 that supports the first and second rolls 18, 20, together with a third roll 30. The rolls 18, 20, 30 are mounted to the main frame 28 for rotation around axes 34, 32, 36, respectively, that are substantially parallel to each other and horizontally oriented with respect to a subjacent support 38 for the entire apparatus 12. The main frame 28 will typically be mounted upon a sub-frame 40 through which the main frame 28 and the associated rolls 18, 20, 30 can be translated in an upstream and downstream direction towards and away from the sheet die 16. It is not necessary to know the details of the construction of the sub-frame 40 to understand the present invention, and thus a detailed description thereof will be omitted herein.

The roll 20 is mounted to the main frame 28 for pivoting movement about its axis 32 by spaced end supports 42, 44, mounted one each upon spaced, main frame sidewalls 46, 48, respectively. The end supports 42, 44 are fixedly mounted to the main frame 28 so that the roll 20 is at all times at a fixed vertical height.

The first roll 18 is maintained operatively positioned upon the main frame 28 through spaced end supports 50, 52 that are respectively guided in vertical paths by cooperating rails 54, 56 on the main frame sidewalls 46, 48, respectively. The third roll 30 is operatively maintained on the main frame 28 through like end supports 58, 60 that respectively cooperate with the rails 54, 56, in like fashion.

Through this arrangement, the first roll 18 can be moved guidingly, selectively upwardly and downwardly relative to the second roll 20, to thereby change the dimensions of the gap 62 therebetween. The roll 30 is similarly movable vertically upwardly and downwardly relative to the roll 20 to adjust the dimensions of a separate gap 64 between the rolls 18, 30.

Before describing in detail the structure of the inventive adjusting mechanisms 22, one prior art adjusting mechanism, as described generally in the Background Art portion hereinabove, will now be described with respect to FIGS. 3-6.

In FIGS. 3-6, two cooperating rolls R1, R2 are shown between which a gap G is established. The roll R1 has an end support ES1, with the roll R2 having a corresponding end support ES2 through which the rolls R1, R2 are respectively supported for rotation around parallel axes. Between the end supports ES1, ES2, an adjusting mechanism AM is provided. The adjusting mechanism AM has a housing 66 within which a jack arrangement is provided including a vertically translatable piston 68 that is operated by a gear 70 that is advanced in rotation by a worm drive 72. The drive 72 has an exposed, stub shaft 74 with a polygonally-shaped end 76 to accommodate a power drive tool that is keyed to turn therewith.

With this arrangement, rotation of the shaft 74 in one direction elevates the piston 68 to increase the dimension of the gap G. Rotation in the opposite direction reduces the dimension of the gap G.

Figure 5:
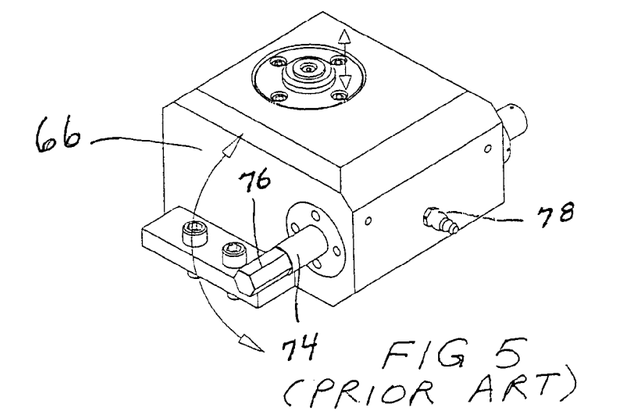
FIG. 5 is an enlarged, perspective view of a portion of the adjusting mechanism in FIGS. 3 and 4.
Figure 6:
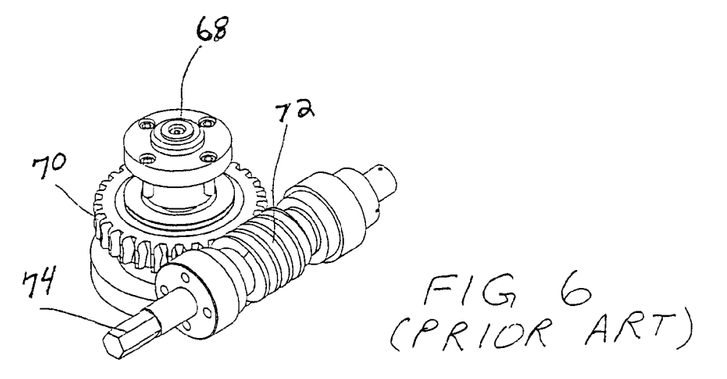
FIG. 6 is an enlarged, perspective view of internal components on the portion of the adjusting mechanism in FIG. 5.

As noted above, this mechanism is relatively complicated and expensive in terms of its construction. The gearing within the housing 66 may be prone to failure and wear and must be kept lubricated, which is facilitated by the provision of a zerk fitting 78. Since a corresponding adjusting mechanism AM is required at each of potentially multiple locations, the problems inherent to the design, notably maintenance, expense, etc., are multiplied.

Additionally, it is difficult to make fine adjustments of the gap dimension with this type of mechanism. Further, it is difficult to determine without a separate measurement tool, precisely what gap has been generated. Again, this inconvenience is experienced at every location where such an adjusting mechanism AM is provided.

The inventive structure will be described in further detail with respect to FIGS. 7-15, taken in conjunction with FIGS. 1 and 2.

With the three rolls 18, 20, 30 shown, four adjusting mechanisms 22, 22', 22", 22''' are incorporated into the roll stand 10 to precisely adjust the dimension of the separate gaps 62, 64. The adjusting mechanisms 22, 22', 22", 22''' are substantially the same in construction and thus detailed description will be limited herein to one exemplary adjusting mechanism 22 that cooperates between the end supports 42, 50 on the rolls 20, 18, respectively.

Figure 7:
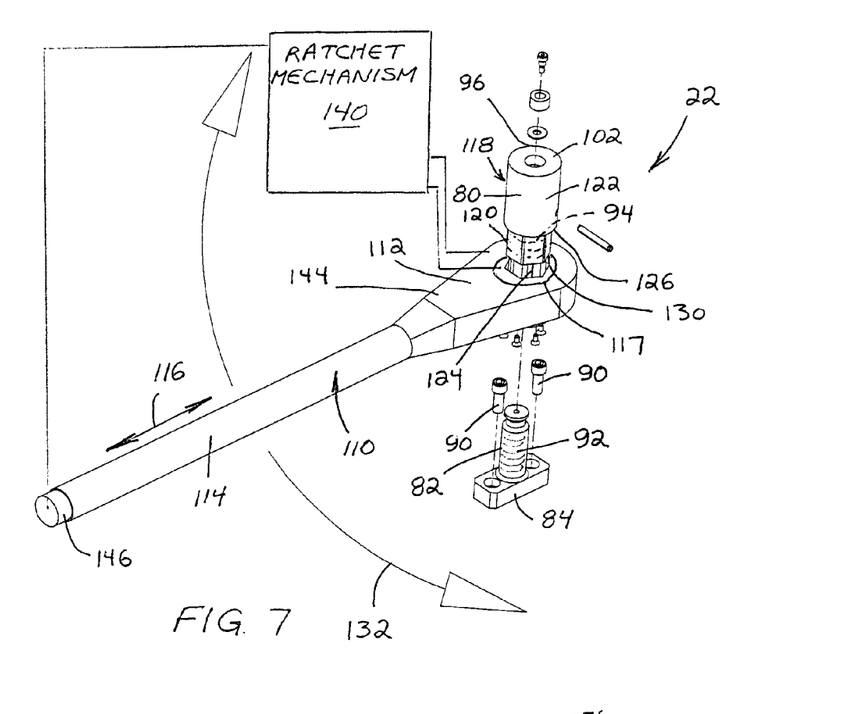
FIG. 7 is an exploded, perspective view of the inventive adjusting mechanism.
Figure 8:
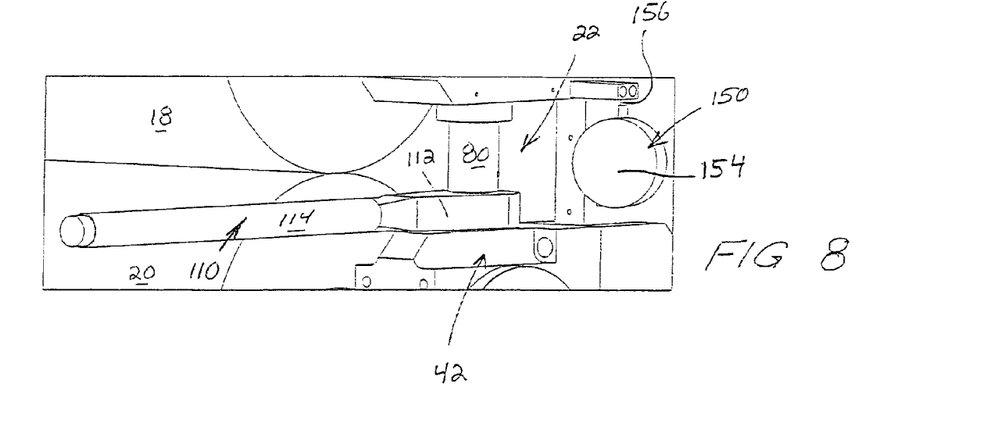
FIG. 8 is a fragmentary, perspective view of the adjusting mechanism in FIG. 7 operatively positioned on the roll stand in FIG. 2 and with adjacent rolls situated to close a gap therebetween.
Figure 9:
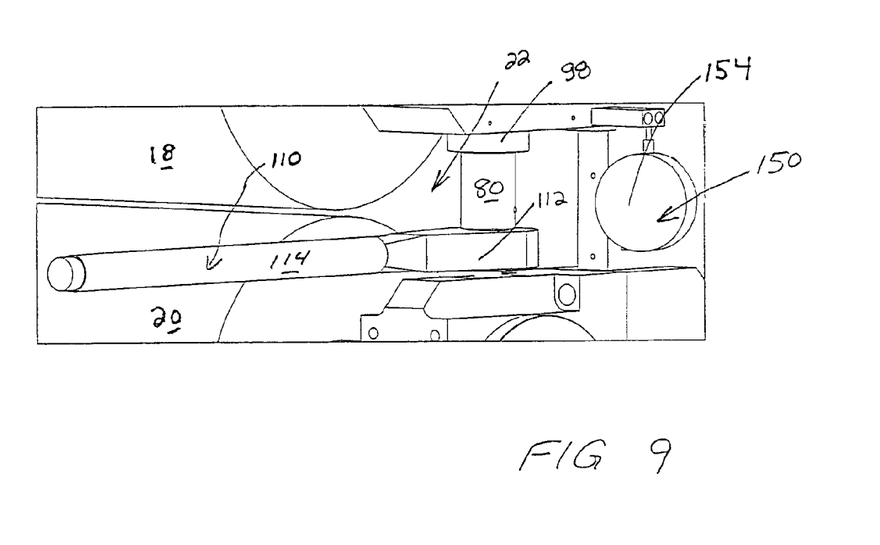
FIG. 9 is a view as in FIG. 8 with the gap between rolls open.
Figure 10:
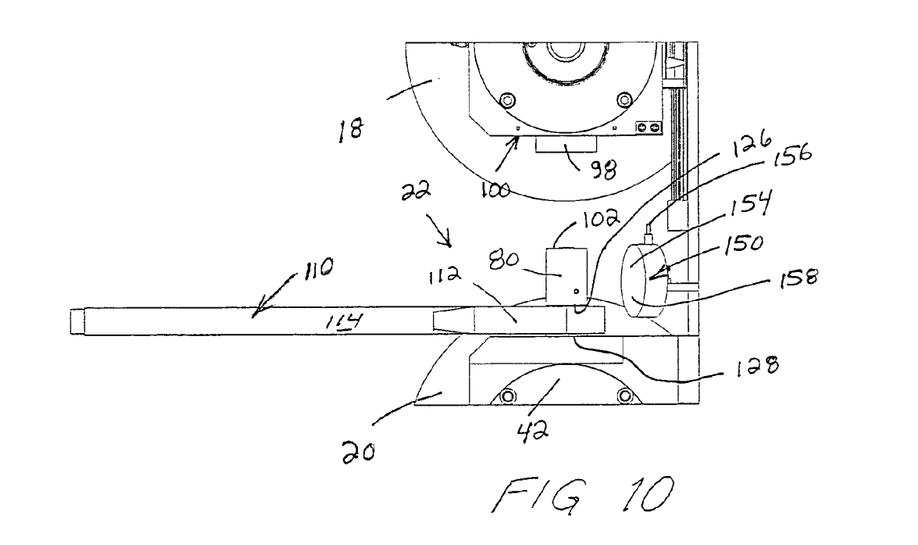
FIG. 10 is a fragmentary, side elevation view of the inventive adjusting mechanism at that portion of the roll stand assembly shown in FIGS. 8 and 9 and with the rolls spaced a substantial distance away from each other in a non-operating state.
Figure 11:
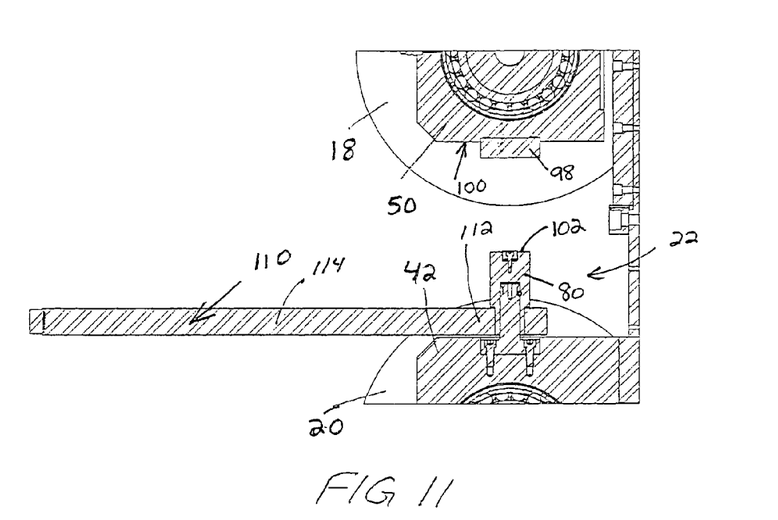
FIG. 11 is a cross-sectional view of the components as in FIG. 10 with detail of internal components on an actuator omitted.
Figure 12:
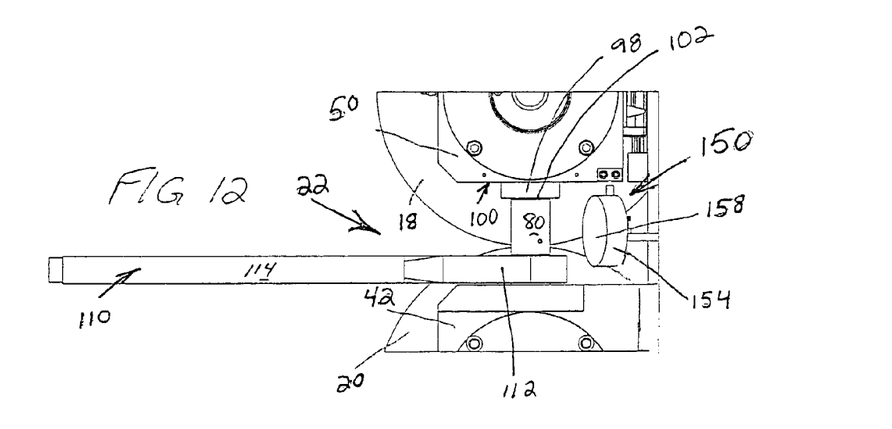
FIG. 12 is a fragmentary, side elevation view of the portion of the. roll stand assembly shown in FIG. 10 and with the gap between cooperating rolls closed.
Figure 13:
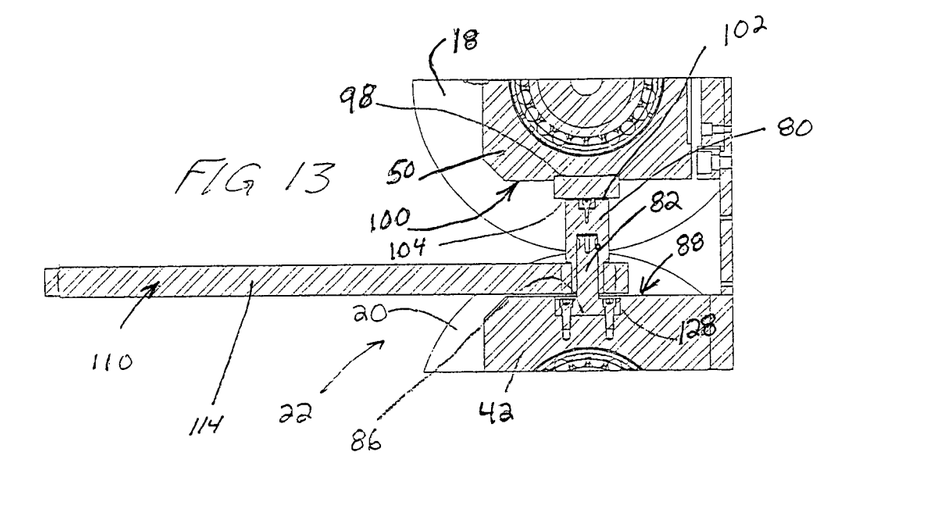
FIG. 13 is a cross-sectional view of the components in FIG. 12 and with detail of internal components on the actuator omitted.
Figure 14:
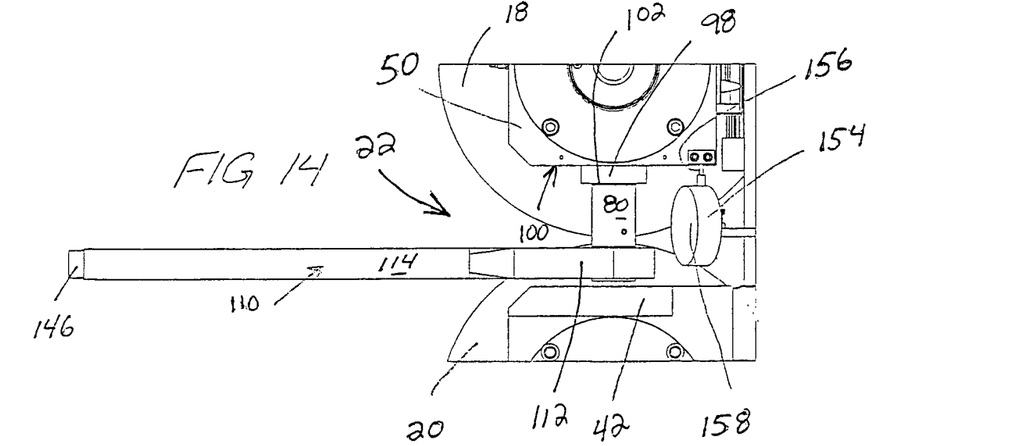
FIG. 14 is a view as in FIG. 12 with the gap open.
Figure 15:
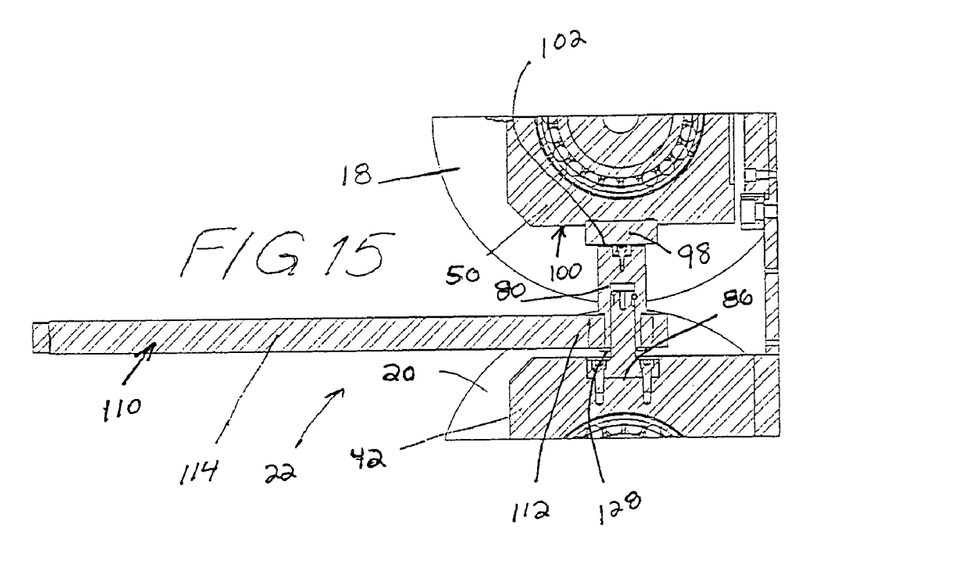
FIG. 15 is a cross-sectional view of the components in FIG. 14 and with detail of internal components on the actuator omitted.

The adjusting mechanism 22 consists of a first element 80 that cooperates with a support 82. The support 82 has a mounting base 84 that nests within a complementarily-shaped, undercut receptacle 86 at the top 88 of the end support 42. The mounting base 84 is maintained in the receptacle by fasteners 90.

The support 82 has a set of external threads 92 that mate with internal threads 94 on the first element 80. By turning the first element 80 around an operating axis 96, that extends substantially vertically, the first element 80 is caused to shift vertically upwardly or downwardly therealong, depending upon the direction of turning.

A bearing pad 98 is secured at the bottom 100 of the end support 50. The first element 80 has a bearing surface 102 that acts against a downwardly facing surface 104 on the bearing pad 98 as the first element 80 is turned to advance the bearing surface 102 vertically upwardly so as to reposition the end support 50 on the roll 18 upwardly relative to the end support 42 on the roll 20 so as to thereby increase the dimension of the gap 62.

To turn the first element 80, an actuator 110 is provided. The actuator 110 consists of a head 112, that cooperates with the first element 80, and an elongate handle 114 with a length extending in the direction of the double-headed arrow 116.

The head 112 has a driving component 117 that is keyed to the first element 80 so that the first element 80 can be turned around the operating axis 96 by a corresponding movement of the component 117 on the head 112 as imparted through movement of the handle 114.

More particularly, the first element 80 has a stepped outer diameter 118 with first and second axially spaced portions 120, 122. The first axially spaced portion 120 has a polygonal shape that can be translated along the axis 96 into a correspondingly-shaped receptacle 124 on the component 117, or any other shape that will be keyed with the portion 120 so that the portion 120 will follow movement of the driving component 117 around the axis 96.

The second portion 122 on the first element defines the aforementioned bearing surface 102.

With the first element 80 threaded onto the support 82, the actuator head 112 is captively blocked between parts of the first element 80 and the end mount 42, that are spaced from each other along the operating axis 96. More specifically, the blocking part on the first element 80 is an annular surface/shoulder 126 between the axially spaced portions 120, 122. The top 88 of the end support 42 performs the blocking function in the axially opposite direction.

To avoid binding between the actuator 110 and the end support 42, a holding ring 128 is fixed at the end 130 of the first element 80 so that the actuator head 112 remains consistently at the same axial location with respect to the first portion 120 of the first element 80. Even though the holding ring 128 blocks downward axial movement of the actuator 110 and thereby prevents the actuator head 112 from shifting downwardly to against the top 88 of the end support 42, the top 88 will be considered for purpose of description herein to block axial movement of the actuator head 112 since, in the absence of the ring 128, the end support 42 performs this function.

With the described arrangement, the actuator 110 is at all times maintained on the apparatus 12, and more particularly on the roll stand 10 thereon. The handle 114 is engageable by the hand of an operator and can be conveniently grasped and manually moved through that hand in a predetermined manner back and forth in an arcuate path, as indicated by the double-headed arrow 132 in FIG. 7, thereby to turn the first element 80 in opposite directions around the operating axis 96.

By turning the first element 80 in one direction around the axis 96, the first element 80, through its threaded cooperation with the support 82, is caused to shift upwardly, thereby raising the end support 50 and thus the roll 18 associated therewith upwardly relative to the end support 42 and roll 20 so as to increase the dimension of the gap 62. Turning of the first element 80 in the opposite direction reverses this movement and thereby reduces the dimension of the gap 62.

To allow the gap 62 to be changed through a substantial dimensional range, without interference between the actuator handle 114 and the other components on the roll stand 10, a ratchet mechanism 140 is incorporated into the actuator 110. The ratchet mechanism 140 may have a conventional construction, and thus detailed description of the same is unnecessary and does not occur herein. It suffices to say that the ratchet mechanism 140 incorporates the generally ring-shaped component 117, within which the receptacle 124 is provided, that can be turned with a ratcheting action selectively in opposite directions, relative to a housing 144 and other components on the head 112.

Through a conventional-type, repositionable knob 146, the ratchet mechanism 140 can be reconfigured selectively to change the actuator 110 between first and second different states wherein the ratcheting occurs in different directions as the handle 114 is operated. More specifically, with the actuator in a first state, as the actuator 110 is moved in the predetermined manner back and forth in the path indicated by the arrow 132, the first element 80 is caused to be turned in increments in one direction around the axis 96, which causes the end support 50 to move upwardly relative to the end support 42, thereby increasing the dimension of the gap between the rolls 18, 20. In the second state for the actuator 110, movement thereof in the predetermined manner back and forth, as indicated by the arrow 132, causes the first element 80 to be turned oppositely whereby the end support 50 moves downwardly relative to the end support 42, thereby to diminish the dimension of the gap 62.

More specifically, with the actuator 110 in its first state, the ratchet mechanism 140 operates to cause the actuator 110 to move the first element 80 so as to increase the dimension of the gap 62 as the first actuator is moved in one of the opposite directions, indicated by the arrow 132, and allows the actuator 110 to be moved oppositely thereto without causing any turning of the first element 80, and thus without causing any repositioning of the end support 50 and its associated roll 18. In the second state, the same action results, with the first element 80 turned in an opposite direction.

The ratchet mechanism 140 also provides a convenient means by which compact storage of the actuator 110 can be effected with a desired gap dimension having been set. By placing the actuator 110 in the appropriate state, once the gap dimension has been set, the handle 114 can be grasped and ratcheted back to a position wherein the length of the handle 114 is alignable in a direction extending between the upstream and downstream ends of the roll stand 10, as shown in FIG. 2. Essentially, the handle 114 is folded compactly against the side of the roll stand 10 in a manner that it does not project significantly away from the sides of the roll stand 10.

As noted above, all of the adjusting mechanisms 22, 22', 22", 22'" can be made to operate in substantially the same manner. For the roll 18, the adjusting mechanisms 22, 22" are used in conjunction with each other to cooperatively control the gap 62. The adjusting mechanisms 22', 22'" cooperate to control the dimension of the gap 64.

In the embodiment depicted, the end supports 42, 44 are shown fixed to the main frame 28, whereby the gaps 62, 64 are controlled by moving the rolls 18, 30 relative to the roll 20. Other arrangements are contemplated.

Further, the adjusting mechanisms 22, 22', 22", 22'" could be fixed to their respective cooperating end supports or the parts could alternatively be separable with or without the release of separate fasteners.

To determine the dimensions of the gaps 62, 64 that have been set, a gap dimension measuring assembly 150 is provided between each of the cooperating end supports that are relatively moved to control gap dimension. The measuring assembly 150 is shown between the exemplary end supports 42, 50 in each of FIGS. 8, 9, 12, and 14.

The gap dimension measuring assembly 150 consists of a housing 154, that is fixed to the main frame 28. A displacement measuring tip 156 engages the end support 50 on the roll 18 and shifts relative to the housing 154 in an amount corresponding to the movement of the end support 50. This movement is converted to a quantified dimension value that is readable on a display 158.

With the above inventive structure, a method of adjusting a gap between adjacent cooperating first and second rolls on a roll stand can be carried out as follows. As shown in block diagram form in FIG. 16, a first adjusting mechanism is provided as shown at block 162. The first actuator is inseparably maintained as part of the roll stand, has a handle, and is movable in a predetermined manner. As shown at block 164, the handle on the actuator is grasped and thereafter moved in the predetermined manner, as shown in block 166, thereby to vary the dimension of a gap between cooperating rolls with which the adjusting mechanism is associated.

Figure 16:
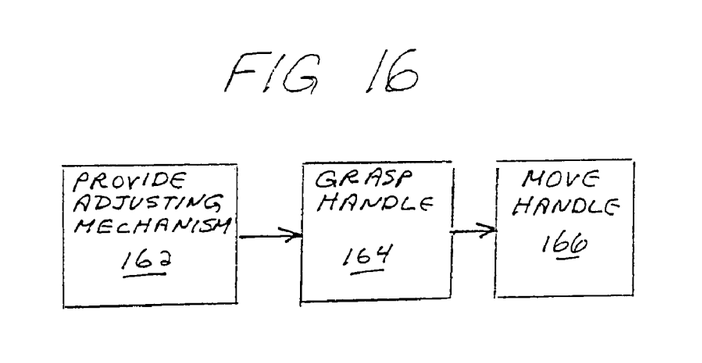
FIG. 16 is a flow diagram representation of a method of adjusting a gap between separate rolls on a roll stand, according to the invention.

The method may be performed with the actuator in the aforementioned first and second states to thereby increase and decrease the gap dimension, depending upon the selected state.

The foregoing disclosure of specific embodiments is intended to be illustrative of the broad concepts comprehended by the invention.

The invention claimed is:

1. A roll stand for use in the extrusion forming of a sheet product from a flowable material, the roll stand comprising:
   a main frame;
   a plurality of rolls including at least first and second rolls between which there is a first gap through which at least one sheet layer passes during sheet product formation,
   the first and second rolls each having spaced end supports through which the first and second rolls are maintained operatively positioned upon the main frame for movement respectively around first and second substantially parallel and substantially horizontal axes; and
   a first adjusting mechanism through which the first roll can be moved relative to the second roll so as to vary a dimension of the first gap to accommodate sheet layers of different thickness,
   the first adjusting mechanism comprising a first element that is movable around a vertically extending operating axis to cause repositioning of one of the end supports on the first roll and a first actuator for causing movement of the first element,
   the first actuator: a) maintained on the roll stand; b) engageable by a hand of an operator; and c) manually movable through an operator's hand in a first predetermined manner to thereby cause incremental movement of the first element so as to thereby cause repositioning of the one of the end supports on the first roll relative to one of the end supports on the second roll and thereby the first roll relative to the second roll to change the dimension of the first gap,
   wherein the roll stand has an upstream end, a downstream end and spaced sides and the first actuator comprises a first elongate handle that is graspable by a user's hand and movable around the operating axis for the first element to operate the first actuator, the first elongate handle having a length, wherein the length of the first handle is alignable in a direction extending between the upstream and downstream ends of the roll stand to be stored so as not to project significantly away from the sides of the roll stand.

2. The roll stand for use in the extrusion forming of a sheet product according to claim 1 wherein the first actuator has first and second states, wherein: a) with the first actuator in the first state movement of the first actuator in the first predetermined manner causes the one of the end supports on the first roll to move to increase the dimension of the first gap; b) with the first actuator in the second state movement of the first actuator in the first predetermined manner causes the one of the end supports on the first roll to move to decrease the dimension of the first gap.

3. The roll stand for use in the extrusion forming of a sheet product according to claim 2 wherein the first adjusting mechanism comprises a first ratchet mechanism, the first actuator is movable in the first predetermined manner in first and second opposite directions, wherein: a) with the first actuator in the first state the ratchet mechanism operates to: i) cause the first actuator to move the first element to reposition the one end support to increase the dimension of the first gap as the first actuator is moved in the first direction; and ii) allow the first actuator to be moved in the second direction without causing repositioning of the one end support; and b) with the first actuator in the second state the ratchet mechanism operates to: i) allow the first actuator to be moved in the first direction without causing repositioning of the one end support; and ii) cause the first actuator to move the first element to reposition the one end support so as to decrease the dimension of the first gap as the first actuator is moved in the second direction.

4. The roll stand for use in the extrusion forming of a sheet product according to claim 1 wherein the first actuator is keyed to the first element so that the first element follows movement of the first actuator around the operating axis.

5. The roll stand for use in the extrusion forming of a sheet product according to claim 4 wherein there is a threaded support with a first set of threads on one of the end supports on the second roll and the first element has a second set of threads, wherein as the first element is turned around the operating axis the first element shifts relative to the threaded support along the operating axis.

6. The roll stand for use in the extrusion forming of a sheet product according to claim 5 wherein the one end support on the first roll has a bearing pad with a surface and the first element has a bearing surface that acts against the surface on the bearing pad as the one end support on the first roll is repositioned relative to the one end support on the second roll.

7. The roll stand for use in the extrusion forming of a sheet product according to claim 6 wherein the one end support on the second roll is at all times fixed in relationship to the main frame.

8. The roll stand for use in the extrusion forming of a sheet product according to claim 6 wherein the roll stand further comprises a second adjusting mechanism that cooperates between the other spaced end supports on the first and second rolls in substantially the same manner that the first adjusting mechanism cooperates between the one spaced end support on the first roll and the one spaced end support on the second roll.

9. The roll stand for use in the extrusion forming of a sheet product according to claim 1 wherein the roll stand further comprises a third roll with spaced end supports through which the third roll is maintained operatively positioned upon the main frame for movement around a third axis that is substantially parallel to the first and second axes, and there is another adjusting mechanism that cooperates between the one spaced end support on the second roll and one of the spaced end supports on the third roll in substantially the same manner that the first adjusting mechanism cooperates between the one spaced end support on the first roll and the one spaced end support on the second roll to thereby selectively vary a dimension of a second gap between the second and third rolls through which at least one sheet layer passes during sheet product formation.

10. The roll stand for use in the extrusion forming of a sheet product according to claim 1 further in combination with an extruder assembly with a sheet die through which flowable material is delivered to a nip location between the first and second rolls.

11. The roll stand for use in the extrusion forming of a sheet product according to claim 1 further comprising a gap dimension measuring assembly with a gap dimension display, the gap dimension measuring assembly comprising a housing fixed to the main frame and a displacement measuring tip that engages the first roll, is repositioned relative to the housing as the first roll is moved, and thereby causes the gap dimension display to indicate degree of displacement of the first roll.

12. A roll stand for use in the extrusion forming of a sheet product from a flowable material, the roll stand comprising:
a main frame;
a plurality of rolls including at least first and second rolls between which there is a first gap through which at least one sheet layer passes during sheet product formation,
the first and second rolls each having spaced end supports through which the first and second rolls are maintained operatively positioned upon the main frame for movement respectively around first and second substantially parallel axes; and
a first adjusting mechanism through which the first roll can be moved relative to the second roll so as to vary a dimension of the first gap to accommodate sheet layers of different thickness,
the first adjusting mechanism comprising a first element that is movable to cause repositioning of one of the end supports on the first roll and a first actuator for causing movement of the first element,
the first actuator: a) maintained on the roll stand; b) engageable by a hand of an operator; and c) manually movable through an operator's hand in a first predetermined manner to thereby cause incremental movement of the first element so as to thereby cause repositioning of the one of the end supports on the first roll relative to one of the end supports on the second roll and thereby the first roll relative to the second roll to change the dimension of the first gap,
wherein the first element is movable around an operating axis to cause repositioning of the one end support and the first actuator is keyed to the first element so that the first element follows movement of the first actuator around the operating axis,
wherein the first actuator is captively blocked between parts of the first element and one of the end supports on the first roll that are spaced from each other along the operating axis.

13. The roll stand for use in the extrusion forming of a sheet product according to claim 12 wherein the first element has a stepped outer diameter with first and second axially spaced portions, there is an annular surface between the axially spaced portions that defines the part of the first element that blocks the first actuator and the first axially spaced portion of the first element is keyed to the first actuator.

14. The roll stand for use in the extrusion forming of a sheet product according to claim 13 wherein the second axially spaced portion defines a bearing surface that acts against the one spaced end support on the second roll as the one end support on the first roll is repositioned relative to the one end support on the second roll.

15. A roll stand for use in the extrusion forming of a sheet product from a flowable material, the roll stand comprising:
a main frame;
a plurality of rolls including at least first and second rolls between which there is a first gap through which at least one sheet layer passes during sheet product formation,
the first and second rolls each having spaced end supports through which the first and second rolls are maintained operatively positioned upon the main frame for movement respectively around first and second substantially parallel axes; and
a first adjusting mechanism through which the first roll can be moved relative to the second roll so as to vary a dimension of the first gap to accommodate sheet layers of different thickness,
the first adjusting mechanism comprising a first element that is movable to cause repositioning of one of the end supports on the first roll and a first actuator for causing movement of the first element,
the first actuator: a) maintained on the roll stand; b) engageable by a hand of an operator; and c) manually movable through an operator's hand around an operating axis in a first predetermined manner to thereby cause incremental movement of the first element so as to thereby cause repositioning of the one of the end supports on the first roll and thereby the first roll relative to the second roll to change the dimension of the first gap,
the first actuator movable around the operating axis and located directly between end supports on the first and second rolls through which the operating axis extends.

16. The roll stand for use in the extrusion forming of a sheet product according to claim 15 wherein the first and second axes are substantially horizontal and the operating axis is substantially vertical.

17. The roll stand for use in the extrusion forming of a sheet product according to claim 15 wherein the first actuator is blocked in movement in axial opposite directions along the operating axis between the end supports on the first and second rolls through which the operating axis extends to prevent separation of the first actuator from the roll stand.

* * * * *